United States Patent [19]
Able et al.

[11] Patent Number: 5,765,833
[45] Date of Patent: Jun. 16, 1998

[54] BRUSH IGNITER SEAL

[75] Inventors: Edward C. Able, Tolland; Thomas J. Madden, Vernon, both of Conn.

[73] Assignee: United Technologies Corporation, Hartford, Conn.

[21] Appl. No.: 577,320

[22] Filed: Dec. 22, 1995

[51] Int. Cl.⁶ ............................................. F16J 15/447
[52] U.S. Cl. ..................................... 277/53; 60/39.821
[58] Field of Search ................... 277/53, 236; 60/39.821, 60/39.827, 39.32

[56] References Cited

U.S. PATENT DOCUMENTS

| | | | |
|---|---|---|---|
| 4,216,651 | 8/1980 | Ormerod | 60/39.827 |
| 4,678,113 | 7/1987 | Bridges et al. | 228/160 |
| 4,781,388 | 11/1988 | Wöhrl et al. | 277/53 |
| 4,989,886 | 2/1991 | Rulis | 277/53 |
| 5,108,116 | 4/1992 | Johnson et al. | 277/53 |
| 5,316,318 | 5/1994 | Veau | 277/53 |

*Primary Examiner*—William A. Cuchlinski, Jr.
*Assistant Examiner*—John L. Beres
*Attorney, Agent, or Firm*—Marina F. Cunningham

[57] ABSTRACT

A brush seal includes an outer retainer ring and a plurality of layers of wire fibers extending inward at a skewed angle from the outer retainer ring and forming a center opening to accommodate an igniter plug therein. The brush seal is mounted onto a combustor wall to allow movement of the igniter plug relative to the combustor wall without damaging the igniter plug and to prevent leakage of air into the combustor.

2 Claims, 2 Drawing Sheets

5,765,833

BRUSH IGNITER SEAL

TECHNICAL FIELD

This invention relates to brush seals and, more particularly, to brush seals for gas turbine engine igniter plugs.

BACKGROUND ART

Conventional gas turbine engines include a compressor, a combustion section, and a turbine sequentially situated about a central axis. A combustor is typically disposed within the annular combustion section between an inner engine case and an outer engine case. A plurality of fuel nozzles supply a mixture of fuel and air to the combustor at a closely controlled ratio. A plurality of igniter plugs protrude through an igniter opening formed within a combustor wall to ignite fuel supplied to the combustor. Each igniter plug is typically fabricated from a fragile ceramic material that is capable of withstanding high temperature within the combustor and is fixedly attached onto the outer engine case.

During various power settings of the gas turbine engine, the combustor moves with respect to the outer engine case as a result of thermal cycling. Since each igniter plug is fixedly attached onto the outer engine case, each igniter plug also moves relative to the combustor. To compensate for the thermal movement of the igniter plug with respect to the combustor as well as for dimensional tolerancing, the igniter opening within the combustor wall is oversized. The oversized igniter opening prevents mechanical interference between the fragile igniter plug and the combustor and potential damage to the igniter plug. However, it is highly undesirable to have air leakage through the oversized opening into the combustor because additional air will dilute the intended local fuel/air ratio needed for ignition.

Existing gas turbine engines incorporate either a solid metal sliding washer or a swivel-type washer. Both types of washers are slidingly mounted within the igniter opening of the combustor wall and can rotate within the mounting. The igniter plug fits inside a hole formed within both types of washers. During thermal and dimensional displacements of the combustor with respect to the outer engine wall, the existing washers slide within their mountings, allowing movement of the igniter plug and minimizing leakage of air into the combustor.

The problem that arises with the sliding washers and swivel-type washers is the excessive wear of the igniter plug. The swivel and sliding washers hit against the igniter plug surface as the washer mass becomes excited by some vibratory and/or acoustical noise, thereby wearing the igniter plugs.

The igniter plugs must be frequently replaced because of the excessive wear, resulting in additional direct cost of replacement parts and more frequent service associated with replacement of parts. Thus, it is desirable to avoid igniter plug wear while allowing movement thereof and preventing air leakage into the combustor.

DISCLOSURE OF THE INVENTION

It is an object of the present invention to provide an improved igniter seal.

It is another object of the present invention to provide a seal for an igniter plug of a gas turbine engine that allows relative movement of the igniter plug, prevents leakage of air, and minimizes wear on the igniter plug.

According to the present invention, a brush seal includes an outer retainer ring and a plurality of layers of wire fibers extending inward at a skewed angle from the outer retainer ring and forming a center opening to accommodate an igniter plug therein. The seal is fixedly attached to a combustor wall. The wire fibers are displaced elastically to meet dimensional and thermal displacements of the igniter plug relative to the combustor during engine operation. The wire fibers resume the original shape after the initial displacement. In the best mode embodiment of the present invention, the wire fibers are arranged to be substantially tangential to the center opening through which the igniter plug fits.

The seal of the present invention does not wear the igniter plug because the individual fibers do not carry significant mass and light elastic loading of the displaced fibers against the igniter prevents vibratory or acoustically induced wear. The seal also allows movement of the igniter plug relative to the combustor and prevents air leakage therethrough.

The foregoing and other objects and advantages of the present invention become more apparent in light of the following detailed description of the exemplary embodiment thereof, as illustrated in the accompanying drawings.

BEST MODE FOR CARRYING OUT THE INVENTION

Figure 1:
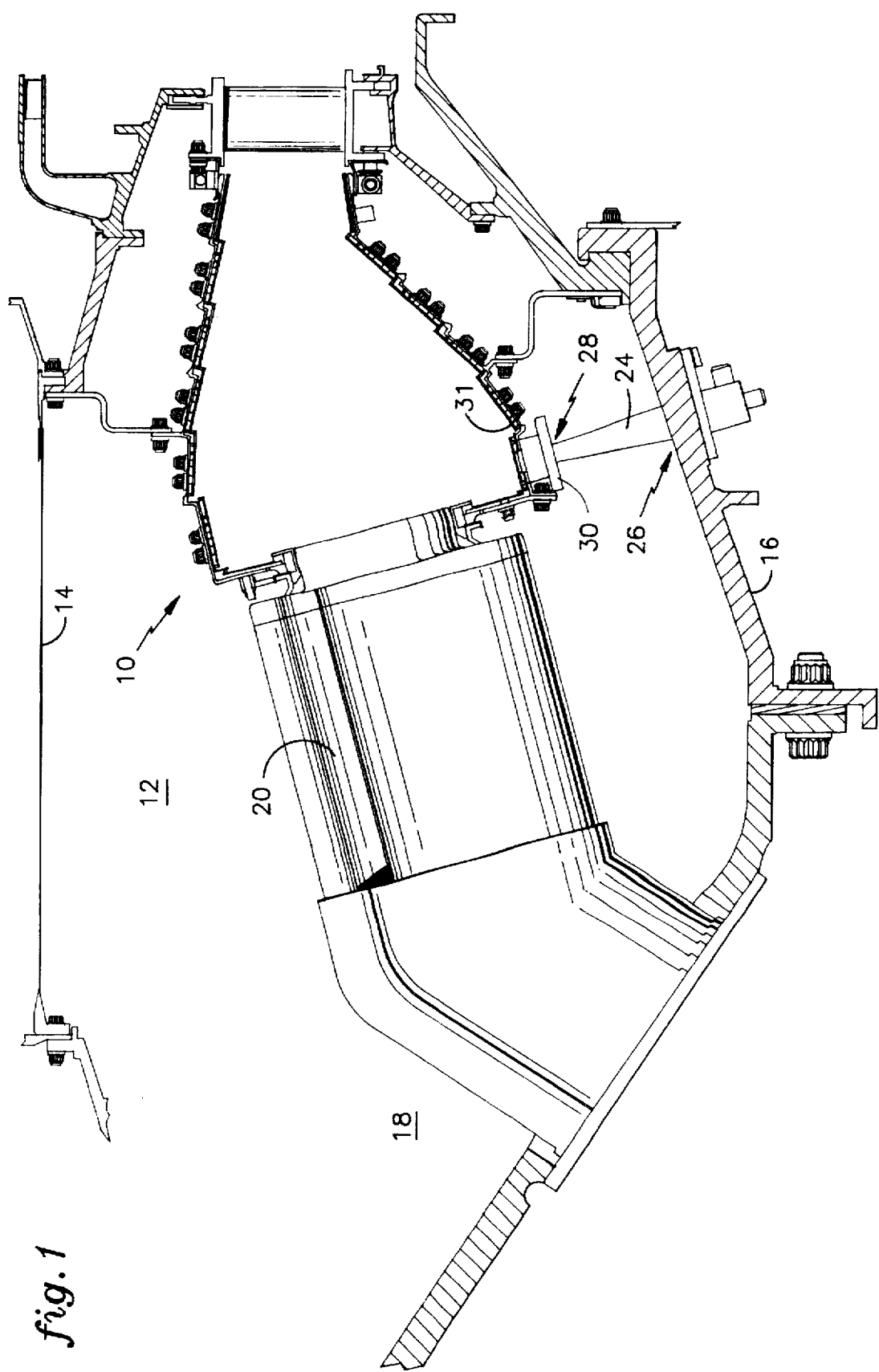
FIG. 1 is a schematic representation of a combustion section of a gas turbine engine with an igniter plug attaching onto an outer engine case and fitting through a brush seal mounted within a combustor wall.

Referring to FIG. 1, a combustor 10 is disposed within an annulus 12 between an inner engine case 14 and an outer engine case 16. A diffuser 18 leads axially into the annulus 12 from a compression section (not shown). Each combustor 10 discharges to a turbine section (not shown). A plurality of fuel nozzles 20 is spaced circumferentially within the annulus 12 to premix fuel with a portion of air exiting the diffuser 18 and to supply the fuel and air mixture to the combustor 10. A plurality of igniter plugs 24 are spaced circumferentially within the annulus 12 to ignite the fuel/air mixture. Each igniter plug 24 includes a base 26 that is fixedly attached onto the outer engine case 16 and a tip 28 that fits through an annular brush seal 30 and protrudes into the combustor 10.

Figure 2:
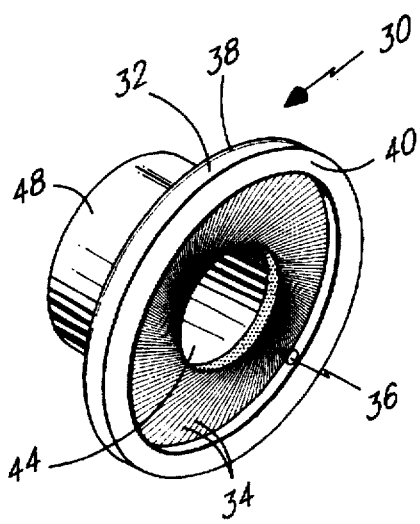
FIG. 2 is an enlarged, perspective view of the brush seal of FIG. 1.
Figure 3:
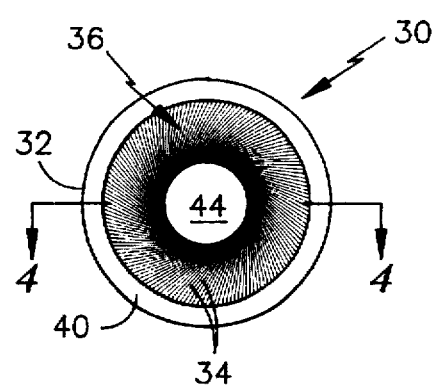
FIG. 3 is a front view of the brush seal of FIG. 2.
Figure 4:
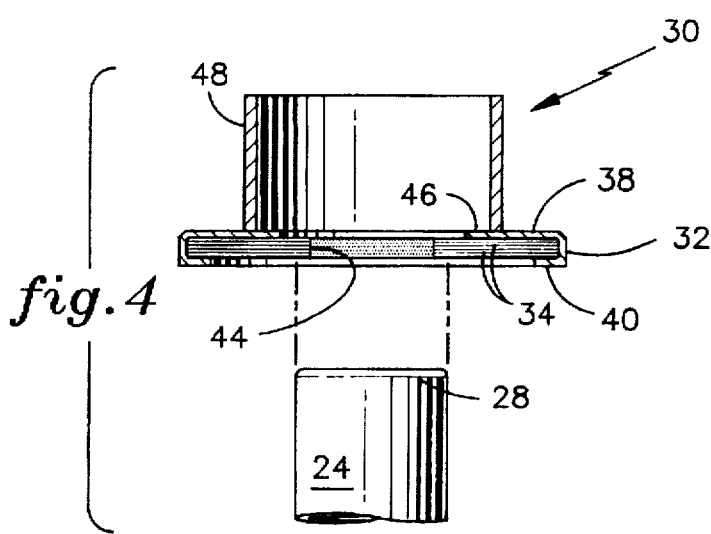
FIG. 4 is an exploded, sectional view of the brush seal taken along lines 4—4 of FIG. 3 with the igniter plug to be fitted therethrough.

The brush seal 30 is fixedly mounted within a combustor wall 31. Referring to FIGS. 2 and 3, each brush seal 30 includes an outer retainer ring 32 with a plurality of layers of wire fibers 34 protruding inward therefrom at a skewed angle to form a wire brush 36. The outer retainer ring 32 includes an inner ring side 38 and an outer ring side 40, as best seen in FIG. 4. The layers of wire fibers 34 are either crimped within the retainer ring 32 or welded therein. The wire fibers 34 form a substantially round center opening 44. The diameter of the center opening 44 is slightly smaller than the outside diameter of the tip 28 of the igniter 24. In the best mode embodiment the wire fibers 34 are arranged to be substantially tangential to the center opening 44.

A back washer 46 is formed on the inner ring side 38 of the retainer ring 32. The inside diameter of the back washer 46 is greater than the outside diameter of the tip 28 of the igniter 24 and is also greater than the diameter of the center opening 44. The back washer 46 can be either formed as an extension of the inner ring side 38 or be fixedly attached thereto. A tube 48 extends substantially perpendicularly from the inner ring side 38 to facilitate attachment of the brush seal 30 onto the combustor wall 31.

During assembly, the tip 28 of the igniter plug 24 is fitted through the center opening 44 of the brush seal 30 so that the tip 28 protrudes from the inner ring side 38 of the brush seal 30. Since the diameter of the central opening 44 is slightly smaller than the outside diameter of the tip 28 of the igniter plug 24, wire fibers 34 fit snugly around the tip 28. Such tight fit minimizes air leakage and reduces rattling of the igniter plug due to vibratory and acoustical excitation. The brush seal 30 is fixedly attached onto the combustor wall 31 by means of welding the tube 48 onto the combustor wall 31. The base 26 of the igniter plug 24 is fixedly attached to the outer engine case 16.

During the operation of the engine, the outer engine case 16 and the combustor 10 move relative to each other as a result of thermal cycling and dimensional tolerancing. The igniter plug 24 moves relative to the combustor wall 31 since the igniter plug 24 is fixedly attached onto the outer engine case 16. As the igniter plug 24 is displaced with respect to the combustor wall 31, the wire fibers 34 displace with movement of the igniter plug 24. Because the wire fibers are arranged to be substantially tangential to the center opening 44, the individual wire fibers 34 bend elastically when necessary and then resume the original position. Since the individual wire fibers do not carry significant mass and each fiber can deform individually, the vibratory wear on the igniter plug is eliminated.

The plurality of layers of the wire fibers minimizes aerodynamic air leakage into the combustor 10. The back washer 46 provides support for the wire fibers 34 so that the wires do not collapse under the pressure load between the combustor 10 and annulus 12 and also helps to maintain wires in position during assembly of the igniter into the brush seal. Thus, the present invention allows movement of the igniter plug 24 relative to the combustor, minimizes the aerodynamic leakage, and eliminates wear of the igniter plug.

The size of the wire fibers is not critical to the present invention, as long as the aspect ratio (length/diameter) of each wire is chosen to insure elasticity over the entire range of motion of the wires.

Although the invention has been shown and described with respect to preferred embodiments thereof, it should be understood by those skilled in the art that various changes and omissions in the form and details thereof may be made therein without departing from the spirit and scope of the invention. For example, the brush seal of the present invention can be used in applications other than with igniter plugs.

We claim:

1. In a gas turbine engine having a combustor and an igniter plug passing through said wall a sealing arrangement for minimizing aerodynamic leakage between said igniter plug and a combustor wall and for allowing movement of said igniter plug relative to said combustor wall comprising:

an outer retainer ring having an inner ring side and an outer ring side;

means for attaching said outer retainer ring to said combustor wall; and a plurality of layers of wire fibers extending inward from said outer ring and forming a center opening having a center opening diameter and being substantially concentric to said outer retainer ring, said wire fibers being arranged to be substantially tangential to said center opening; said center opening diameter being smaller than the diameter of said igniter plug, said igniter plug fitting snugly into said center opening.

2. The brush igniter seal according to claim 1 further characterized by a back washer disposed on said inner side of said outer retainer ring.

* * * * *